April 15, 1952    C. A. SCHLACK ET AL    2,592,604
APPARATUS FOR INTRAORAL PHOTOGRAPHY
Filed Dec. 15, 1948    2 SHEETS—SHEET 1

INVENTORS.
CARL A. SCHLACK
BY BARNEY L. TAYLOR
D.C. Snyder
Attorney

April 15, 1952     C. A. SCHLACK ET AL     2,592,604
APPARATUS FOR INTRAORAL PHOTOGRAPHY
Filed Dec. 15, 1948                     2 SHEETS—SHEET 2
FIGURE 4.
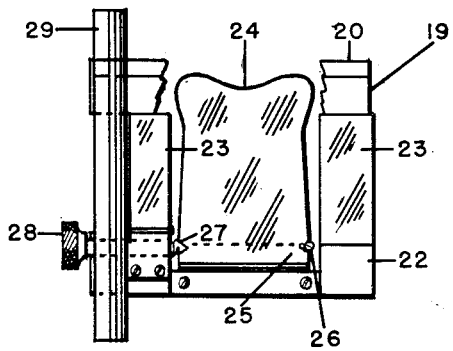
FIGURE 5.
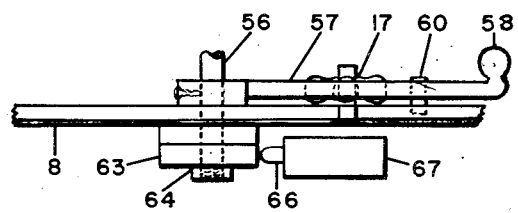
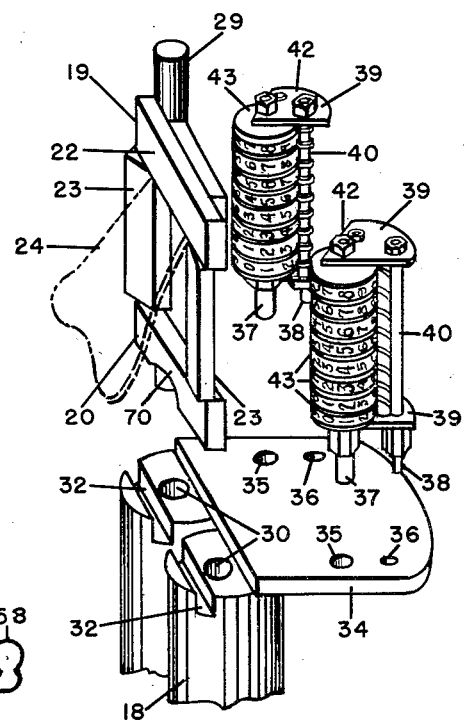
FIGURE 3.
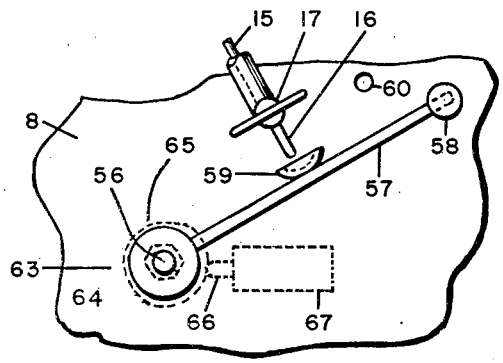
FIGURE 6.
INVENTORS.
CARL A. SCHLACK
BY BARNEY L. TAYLOR
*Attorney*

Patented Apr. 15, 1952

2,592,604

UNITED STATES PATENT OFFICE 2,592,604

APPARATUS FOR INTRAORAL PHOTOGRAPHY

Carl A. Schlack, United States Navy, Upper Darby, Pa., and Barney L. Taylor, United States Navy, Garrett Park, Md.

Application December 15, 1948, Serial No. 65,498

4 Claims. (Cl. 95—11)

(Granted under the act of March 3, 1883, as amended April 30, 1928; 370 O. G. 757)

This invention relates to equipment for making photographs of intra-oral structures, particularly the dental arches and supporting structures.

No equipment is known for mass photography of dental structures on a large scale, and there is need for such equipment, operable with facility to produce pictures for identification or for permanent records in dental clinics. There is a chance for error in making up dental charts and, moreover, they can be interpreted only with difficulty due to variations in the recording of dental data.

In the past, pictures have been taken of portions of the oral cavity in a rather hit or miss fashion by concentrating a light thereon and simply pointing the camera. This is unsatisfactory because the picture may be incomplete, or not exactly in focus; and it also may not be clear, especially near the edges, due to insufficient or to non-uniform illumination.

It is the primary object of the present invention to devise precision apparatus for making clear pictures, and especially in natural colors, of intra-oral structures.

It is a further important object to so design such an apparatus that pictures for identification of numerous persons may be made rapidly in mass quantities.

Another major object of this invention is to provide a novel illumination system, involving a set of mirrors, for projecting light rays uniformly and without glare upon the exposed surfaces of the objects to be photographed. In this connection it is an object to provide a second set of mirrors so associated with the first set and with one or more numbering devices that the photographic prints will have marginal identification numbers appearing thereon. Such a serial numbering system is particularly useful for mass photography on continuous strip film of the intra-oral structures of members of the armed forces.

The present invention further contemplates a camera and mirror relationship wherein an inspection mirror, normally out of the field of view of the camera, may be moved into the field of view to reflect to the operator an image of the object to be photographed. This arrangement is convenient to the operator and it ensures that a good picture will be taken. In this connection it is another object to devise a shutter actuating mechanism that automatically shifts the inspection mirror out of the field of view prior to shutter actuation.

It is a further object to devise a combined operating mechanism for the lighting system and the shutter whereby the light is turned on automatically prior to shutter actuation.

Still another object is to provide an improved mirror of special shape that will fit readily and comfortably within the oral cavity and supply complete reflections of the dental structure.

The foregoing and other objects of the present invention should clearly appear from a study of the following description when taken in conjunction with the accompanying drawings, wherein:

Fig. 3 represents an exploded detail view in perspective, showing the manner in which the primary set of mirrors and the numbering devices are assembled and mounted;

Fig. 4 is a face view of the reflecting side of the primary set of mirrors and their supports;

Fig. 5 is a side view of the control mechanism as seen when looking into Fig. 1 from the reader's position at the level of the base platform; and Fig. 6 represents a top plan view of the apparatus fragmentarily shown in Fig. 5.

Figure 1:
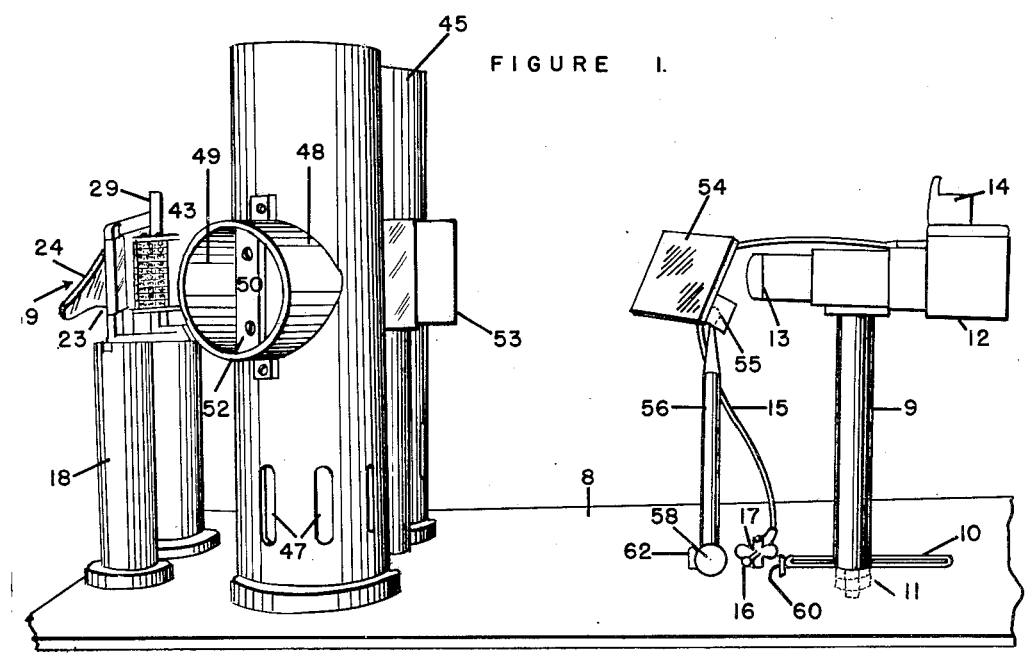
Fig. 1 is an elevational view, slightly in perspective, of a preferred form of apparatus of the invention as seen from the operator's side position.

With continued reference to the drawings, wherein like characters designate like parts, there is a platform 8 supporting a camera post 9, the post being oscillatable and also adjustable along a slot 10 towards and from an object to be photographed, a nut 11 being provided below the platform to lock the post in ajusted position. The post carries a camera 12 having a lens device 13, and a view finder 14 that is used to obtain correct initial setting for the combined post and camera.

The camera has a shutter cable 15 provided with the usual slidable push-pin 16 and anchored to the base 8 by an element 17 in a definite position so that the cable release will be actuated at a particular time in sequence with other manipulations by mechanism later described.

At the forward end of the platform and directly in front of the camera there are two stationary posts 18 provided to support a detachable primary set of mirrors, indicated generally at 19. This set comprises a rectangular frame consisting of horizontal bars 20 and 22 interconnected by a pair of vertical wing mirrors 23. Each wing mirror is fixed with its reflecting surface at an angle to the plane of the rectangle for a purpose presently seen; and these as well as all other mirrors preferably are formed of highly polished stainless steel.

The assembly further comprises a "mouthpiece" mirror 24 aligned directly with the camera and designed to have two different positions (Figs. 1 and 2) in which it may be received in the oral cavity to reflect images of the upper and lower dental structures to the camera lens. For ready removal and sterilization the mirror 24 is notched at one edge at 25 (Fig. 4) for engagement with a screw 26, and is clamped at its other edge against an inclined surface portion of frame member 22 by the conical end of a screw 27 that is manipulated by a knurled head 28.

In order to mount the mirror unit in either of its two positions and to hold it in line with the camera, a vertical rod 29 is secured at one side edge of the frame with its ends projecting therebeyond for reception, respectively in one of two holes 30 (Fig. 3) provided in the tops of the posts 18; and the post tops further have transverse slots 32 for reception of the outer edges of the frame members 20, 22. For example, in Fig. 3 the member 20 is about to enter the slots 32 and the post is about to enter the left hand hole 30. To obtain the position seen in Fig. 2, the unit is lifted up, inverted by rotating it 180° clockwise in the plane of the framework and then settled into its new position.

Mounted rigidly upon the posts 18 adjacent the holes 30 is a flat bracket 34 having two holes 35 and two smaller holes 36 for reception, respectively, of pins 37 and 38 of a pair of removable numbering units. Each unit further comprises a pair of parallel plates 39 held in spaced relationship by shaft assemblies 40 and 42, with a stack of independently rotatable collars 43 surrounding the shaft 42. These units form no part of this invention except insofar as they are related to the wing mirrors 23 to provide a vertical row of selected numerals for reflection to the camera lens so that a number will appear at each vertical edge of the picture. Preferably, two units are utilized so that an assigned serial number and also, say, a code number can be photographed; but it should be understood that a single unit for producing a single number falls within the scope of the present invention.

The illumination system also is very important and is designed to afford a great sufficiency of concentrated light with substantially no glare. It comprises a pair of vertical casings 45 fixedly supported on the platform 8 at opposite sides of the line of sight, each containing a lamp 46. As the lamps are powerful (preferably about 1000 watts) ventilation is afforded by providing apertures 47 and leaving the tops of the casings open. Each casing has, at the level of its lamp filament, an offset intersecting housing 48 that is inclined slightly forwardly. Each casing carries a concave steel mirror 49 and is adjustably attached to a strap 50 by screws 52 to give it proper focus relative to the lamp filament. The straps are brazed to the housings. In line with the focal axes of the mirrors the casings have apertures 51 through which the concentrated light beams are reflected.

The casings 45 fixedly carry a pair of mirrors 53, arranged in the paths of the light beams at such angles as to reflect the latter directly against the polished surface of the mouth mirror 24 that faces the camera between the number mirrors 23. Thus a perfectly illuminated image of the dental structure is thrown to the camera between a pair of numbers thrown by the mirrors 23, all appearing on the print that is made. Moreover, consecutive frames of a film strip may be printed or enlarged without cutting the film, and the completed prints or enlargements will appear in their proper aspect. The apparatus is thus designed to provide consecutive exposures of the reflected lower dental arch, upper dental arch, and anterior teeth upon a film strip from which photographic prints or enlargements of proper viewing aspect may be obtained without cutting the film strip or rearranging the consecutive order of the frames.

Adjacent the camera lens there is provided an inspecting mirror 54 universally mounted at 55 upon a vertical stem 56 that extends through and is rotatable within the base 8. A lever 57 (Figs. 5 and 6) is secured at one end to the stem and at its other end has a manipulating knob 58. Between its ends the lever has a smooth curved surface 59 engageable with the pin 16 to actuate the camera shutter just prior to the time that the lever (when oscillated counterclockwise) abuts a stop pin 60. Its other direction of swinging movement is limited by a second stop pin 62 (Fig. 1).

When the mirror 54 is properly adjusted and the lever is in the position of Fig. 1, the mirror is disposed in front of the camera lens and affords to the operator an inspection of the view to be photographed. When the operator has checked the view and is satisfied, he swings the lever towards the stop 60, thus first moving the mirror out of the way, as in Fig. 2, and then actuating the shutter. If desired, the lamp circuit may be simultaneously controlled by the lever in this swinging movement, as follows.

As shown in Figs. 5 and 6, a cam 63 is secured to the lower end of the stem 56 by a nut 64, and is substantially cylindrical except for a relieved portion 65 approximately 90 degrees in length, which corresponds with the pivotal arc of the lever. The pin 66 of a conventional micro-switch 67 rides upon the surface 65, and it closes the switch at or adjacent each end of said surface. In between the ends the switch is open. Thus when the lever is in the position of Fig. 1, the lamps are off, but may be turned on by slight oscillation of the lever; and just prior to actuation of the shutter the lights are lighted, this position being that just attained in Fig. 6. An additional manually operable switch may be provided if desired.

The mode of operation should now be fairly obvious. The platform 8 is disposed at a convenient height and may be adjustable to various levels to accommodate subjects (persons) of different sizes. To photograph the lower dental structure, the subject moves his head into such position that the mirror 24, disposed as in Fig. 1, is received in his mouth. The operator then inspects mirror 54 and advises the subject to move his head or lower jaw, if necessary, to obtain a better showing. Then the lever 57 is oscillated to actuate the shutter, and thereafter returned to its initial position.

Figure 2:
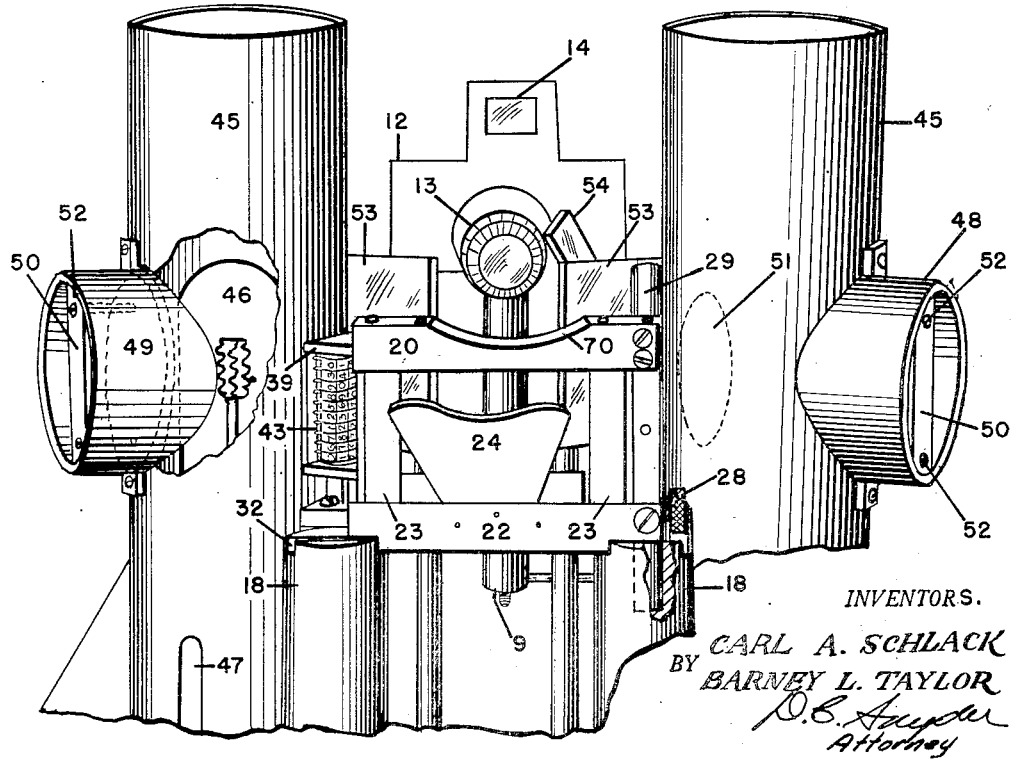
Fig. 2 is a front elevation, as seen from the position of the subject to be photographed, of the same apparatus, certain parts being partially broken away for clarity of illustration.

Next, the mirror set 19 is inverted to its position of Fig. 2 and the mirror 24 is again received in the oral cavity, this time to photograph the upper dental structure, the operations described above being repeated.

The mirror 24 is specially designed to comfortably and effectively fit all normal mouths. Occasionally it may be necessary to substitute one of a different size. The mirror is roughly rhomboidal in contour and has two curved lobes at its outer corners which spread the cheeks to obtain complete reflection and thorough illumination. A slight depression in the contour of the periphery is provided between the two curved lobes to prevent contact of the mirror with the sensitive soft palate of the mouth.

To obtain a frontal photograph the front teeth, both upper and lower in a single picture, the subject tilts his head forwardly and rests his nose upon the recessed surface 70 of the member 20 (Fig. 2) and spreads his lips with his fingers to fully expose as many front teeth as possible to the upper surface of the mirror, which of course is outside the oral cavity for this exposure.

In preparation for the next patient or subject, the mouth mirror is removed, sterilized and reinserted. The numbering devices are removed and one or more of their collars 43 oscillated to obtain predetermined new numbers, and then reinserted.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. Apparatus for mass intra-oral photography adapted to provide consecutive exposures of the reflected lower dental arch, upper dental arch, and anterior teeth, upon a film strip from which prints of proper viewing aspect may be obtained without cutting the film strip or rearranging the consecutive order of the frames, comprising supporting means, a camera mounted on said supporting means, a vertically disposed frame removably mounted on said supporting means in line with said camera, and a mirror shaped to enter the mouth and secured to said frame at an angle intermediate the horizontal and vertical, said removable frame being invertible on said support for consecutively photographing the lower and upper dental arches in proper aspect on a film strip, said supporting means having a pair of spaced sockets therein, said frame including pins at the top and bottom thereof for selective insertion in said sockets by inverting said frame.

2. Apparatus for mass intra-oral photography adapted to provide consecutive exposures of the reflected lower dental arch, upper dental arch, and anterior teeth, upon a film strip from which prints of proper viewing aspect may be obtained without cutting the film strip or rearranging the consecutive order of the frames, comprising supporting means, a camera mounted on said supporting means, a vertically disposed frame removably mounted on said supporting means in line with said camera, and a mirror shaped to enter the mouth and secured to said frame at an angle intermediate the horizontal and vertical, said removable frame being invertible on said support for consecutively photographing the lower and upper dental arches in proper aspect on a film strip, said supporting means having a pair of spaced sockets therein, said frame including pins at the top and bottom thereof for selective insertion in said sockets by inverting said frame, said supporting means having a slot in the top thereof adjacent said sockets, and said frame including parallel cross members at the top and bottom thereof selectively receivable in said slot.

3. Apparatus for mass intra-oral photography adapted to provide consecutive exposures of the reflected lower dental arch, upper dental arch, and anterior teeth, upon a film strip from which prints of proper viewing aspect may be obtained without cutting the film strip or rearranging the consecutive order of the frames, comprising supporting means, a vertically disposed frame removably mounted on said supporting means for alignment with a camera, and a mirror shaped to enter the mouth and secured to said frame at an angle intermediate the horizontal and vertical, said removable frame being invertible on said support for consecutively photographing the lower and upper dental arches in proper aspect on a film strip, said supporting means having a pair of spaced sockets therein, said frame including pins at the top and bottom thereof for selective insertion in said sockets by inverting said frame.

4. Apparatus for mass intra-oral photography adapted to provide consecutive exposures of the reflected lower dental arch, upper dental arch, and anterior teeth, upon a film strip from which prints of proper viewing aspect may be obtained without cutting the film strip or rearranging the consecutive order of the frames, comprising supporting means, a vertically disposed frame removably mounted on said supporting means for alignment with a camera, and a mirror shaped to enter the mouth and secured to said frame at an angle intermediate the horizontal and vertical, said removable frame being invertible on said support for consecutively photographing the lower and upper dental arches in proper aspect on a film strip, said supporting means having a pair of spaced sockets therein, said frame including pins at the top and bottom thereof for selective insertion in said sockets by inverting said frame, said supporting means having a slot in the top thereof adjacent said sockets, and said frame including parallel cross members at the top and bottom thereof selectively receivable in said slot.

CARL A. SCHLACK.
BARNEY L. TAYLOR.

REFERENCES CITED

The following references are of record in the file of this patent:

UNITED STATES PATENTS

| Number | Name | Date |
| --- | --- | --- |
| 667,441 | Hare | Feb. 5, 1901 |
| 770,854 | Hare | Sept. 27, 1904 |
| 1,622,554 | Wallace | Mar. 29, 1927 |
| 1,826,664 | Hopkins | Oct. 6, 1931 |
| 2,006,007 | Zimmer | June 25, 1935 |
| 2,017,472 | Re | Oct. 15, 1935 |
| 2,072,390 | Hartingsvelt | Mar. 2, 1937 |
| 2,239,379 | Bucky | Apr. 22, 1941 |
| 2,280,561 | Wappler | Apr. 21, 1942 |
| 2,297,799 | Pifer | Oct. 6, 1942 |
| 2,314,033 | Curran | Mar. 16, 1943 |
| 2,518,347 | Mandel | Apr. 8, 1950 |

FOREIGN PATENTS

| Number | Country | Date |
| --- | --- | --- |
| 674,647 | France | Oct. 22, 1929 |